United States Patent
Berroth et al.

(10) Patent No.: US 6,995,534 B2
(45) Date of Patent: Feb. 7, 2006

(54) METHOD OF CONTROLLING THE COMMUTATION IN AN ELECTRONICALLY COMMUTATED MOTOR, AND AN ELECTRONICALLY COMMUTATED MOTOR FOR CARRYING OUT SAID METHOD

(75) Inventors: Hansjörg Berroth, Villingen-Schwenningen (DE); Thomas Von Der Heydt, St. Georgen (DE); Frank Jeske, St. Georgen (DE); Arnold Kuner, St. Georgen (DE); Paul Layes, Donaueschingen (DE); Hans-Dieter Schondelmaier, St. Georgen (DE); Günther Strasser, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 74 days.

(21) Appl. No.: 10/432,444
(22) PCT Filed: Jul. 20, 2002
(86) PCT No.: PCT/EP02/08109

§ 371 (c)(1),
(2), (4) Date: May 19, 2003

(87) PCT Pub. No.: WO03/015255
PCT Pub. Date: Feb. 20, 2003

(65) Prior Publication Data
US 2004/0056617 A1 Mar. 25, 2004

(30) Foreign Application Priority Data
Aug. 10, 2001 (DE) .......................................... 101 39 535

(51) Int. Cl.
H02P 7/00 (2006.01)

(52) U.S. Cl. ........................ 318/434; 318/245; 318/254; 388/811

(58) Field of Classification Search ................. 318/139, 318/254, 434, 439, 138, 700, 701, 707; 388/800, 388/806, 811, 815, 821, 822
See application file for complete search history.

(56) References Cited

U.S. PATENT DOCUMENTS 4,473,781 A * 9/1984 Nielsen ....................... 318/254
5,093,891 A * 3/1992 Komiyama et al. ......... 388/813

(Continued)

FOREIGN PATENT DOCUMENTS

DE 39 19 952 A1 12/1990
EP 0 452 497 A1 4/1991

(Continued)

Primary Examiner—Paul Ip
(74) Attorney, Agent, or Firm—Milton Oliver, Esq.; Ware Fressola Van Der Sluys & Adolphson LLP (57) ABSTRACT

A method is disclosed for controlling the commutation in an electronically commutated motor (20) which comprises a stator having at least one phase (24, 26), and a permanent-magnet rotor (22), and with which a current limiter (36, 58) and a controller (18) for regulating a motor variable are associated. The current limiter (36, 58) serves to limit the current (I) in the at least one phase (24, 26) to a setpoint value. The regulation by means of the controller (18) is accomplished by modifying the distance in time (W) between switching on (t1) and switching off (t2) of the current (i1, i2) in the at least one phase. In this method, the setpoint value to which the current limiter limits the current (i1, i2) in the relevant phase is modifiable. It is modified substantially as a function of a ratio of two times (W/T), namely as a function of the ratio of the distance in time (W) between switching on (t1) and switching off (t2) of the current (i1, i2) in the relevant phase (24, 26) to the time period (T) required by the rotor, at the instantaneous rotation speed, to rotate through a specified rotation angle. A decrease in noise at low rotation speeds is thereby made possible.

21 Claims, 9 Drawing Sheets

U.S. PATENT DOCUMENTS

| | | | |
|---|---|---|---|
| 5,207,520 A | | 5/1993 | Tanaka ....................... 400/279 |
| 5,246,479 A | * | 9/1993 | Gami et al. .............. 360/73.03 |
| 5,845,045 A | * | 12/1998 | Jeske et al. .................. 388/804 |
| 6,013,966 A | | 1/2000 | Fehrenbacher et al. ..... 310/257 |
| 6,091,887 A | * | 7/2000 | Dieterle et al. ............. 388/811 |
| 6,396,226 B2 | * | 5/2002 | Schmider et al. ........... 318/254 |
| 6,429,615 B2 | * | 8/2002 | Schmider et al. ........... 318/254 |
| 6,703,803 B2 | * | 3/2004 | Ohiwa et al. ............... 318/138 |
| 2001/0003412 A1 | * | 6/2001 | Schmider et al. ........... 318/254 |
| 2001/0004194 A1 | * | 6/2001 | Schmider et al. ........... 318/254 |
| 2003/0155886 A1 | * | 8/2003 | Ohiwa et al. ............... 318/727 |

FOREIGN PATENT DOCUMENTS

| | | |
|---|---|---|
| EP | 0 666 424 A1 | 8/1995 |
| EP | 0 908 630 A1 | 8/1998 |
| EP | 0 657 989 B1 | 4/1999 |
| EP | 1 107 441 A2 | 6/2001 |
| FR | 2475312 | 8/1981 |

* cited by examiner

Fig. 10

METHOD OF CONTROLLING THE COMMUTATION IN AN ELECTRONICALLY COMMUTATED MOTOR, AND AN ELECTRONICALLY COMMUTATED MOTOR FOR CARRYING OUT SAID METHOD

FIELD OF THE INVENTION

The invention concerns a method of controlling the commutation in an electronically commutated motor (ECM), and an ECM for carrying out such a method.

BACKGROUND

EP 1 107 441 A2 and corresponding U.S. Pat. No. 6,396,226, SCHMIDER & LUKENICH, disclose an ECM in which an arrangement for current limiting is provided. Current limiting is important in particular upon startup of a motor, since when a motor's rotation speed is low, the voltage induced in its stator winding by the permanent-magnet rotor—the so-called counter-EMF—is also low; at startup, this can result in high currents which are substantially greater than the rated current of such a motor. If no current limiter is provided, the magnitude of the current spikes upon startup is limited only by the winding resistance and by the magnitude of the counter-EMF (which is low at low rotation speeds). These high currents result in corresponding motor noise, which is present in the audible range and whose frequency corresponds to the commutation frequency. This is explained below with reference to FIG. 3.

It is known from EP 1 107 441 A2 and U.S. Pat. No. 6,396,226 to suppress current limiting at startup in order to permit fast acceleration. This is done by connecting a bypass transistor in parallel with a current measuring resistor. This bypass transistor is made conductive for 0.5 second at startup, and during that period no current limiting occurs. This elevation of startup current is permissible only with small motors, however, and requires a high-power bypass transistor that must be capable of conducting the greatly elevated starting current for 0.5 second.

SUMMARY OF THE INVENTION

One object of the invention is therefore to make available a new method for controlling the commutation, and a new electronically commutated motor suitable therefor.

According to the invention, this object is achieved by modifying the current limit value according to the ratio W/T, as explained below. The result of such a method is that current limiting is modified in load-dependent fashion, so that the upper current limit is lower at low rotation speeds, when the motor requires little power, than at high rotation speeds. The amplitude of the current pulses that flow through the stator at low rotation speeds is thereby automatically reduced, and the block length of those pulses is automatically increased by the rotation speed controller to compensate; this causes the motor to run more quietly, and can also bring about an improvement in efficiency.

Another means of achieving the stated object is to control the ON/OFF switching of the winding current using a first control signal and to control the shape of the current using a second control signal. A method of this kind allows the shape of the stator current pulses to be actively influenced, and quiet, smooth motor operation can thereby be achieved.

Another means of achieving the stated object is to employ first, second, and third controllable semiconductor elements. Here, depending on the magnitude of the additional control signal, a variable value for the level of current limiting can be specified in a motor of this kind. At low rotation speed, for example, a low value can be specified which increases with increasing rotation speed; and when a specific rotation speed of the motor is reached, current limiting is then completely switched off, since the motor is itself automatically limiting the current as a result of the rise in its induced voltage.

Another means of achieving the stated object is to use a semiconductor element controlled by a first control signal having a frequency $1/T$ and a second signal with a frequency which is an integer multiple of the frequency of the first control signal. The higher-frequency signal makes possible active influencing of the shape of the stator current pulses, which is of interest especially for motors in which the rotation speed is a function of an ambient temperature. Such motors have low rotation speeds at low temperatures, and require only a low current therefor. Because it is possible in this case for the semiconductor switches that switch the stator current off and on to be operated as resistors, active configuration of the shape of the stator current pulses is possible in particular in a rotation-speed-controlled motor, in order to ensure quiet motor operation at low rotation speeds.

BRIEF FIGURE DESCRIPTION

Further details and advantageous developments of the invention are evident from the exemplary embodiments, which are in no way to be understood as a limitation of the invention and which are described below and depicted in the drawings, and from the dependent claims. In the drawings:

DETAILED DESCRIPTION

In the Figures that follow, identical or identically functioning parts are in each case labeled with the same reference characters and usually are described only once. This applies in particular to the identical components in FIGS. 4 and 6.

Figure 1:
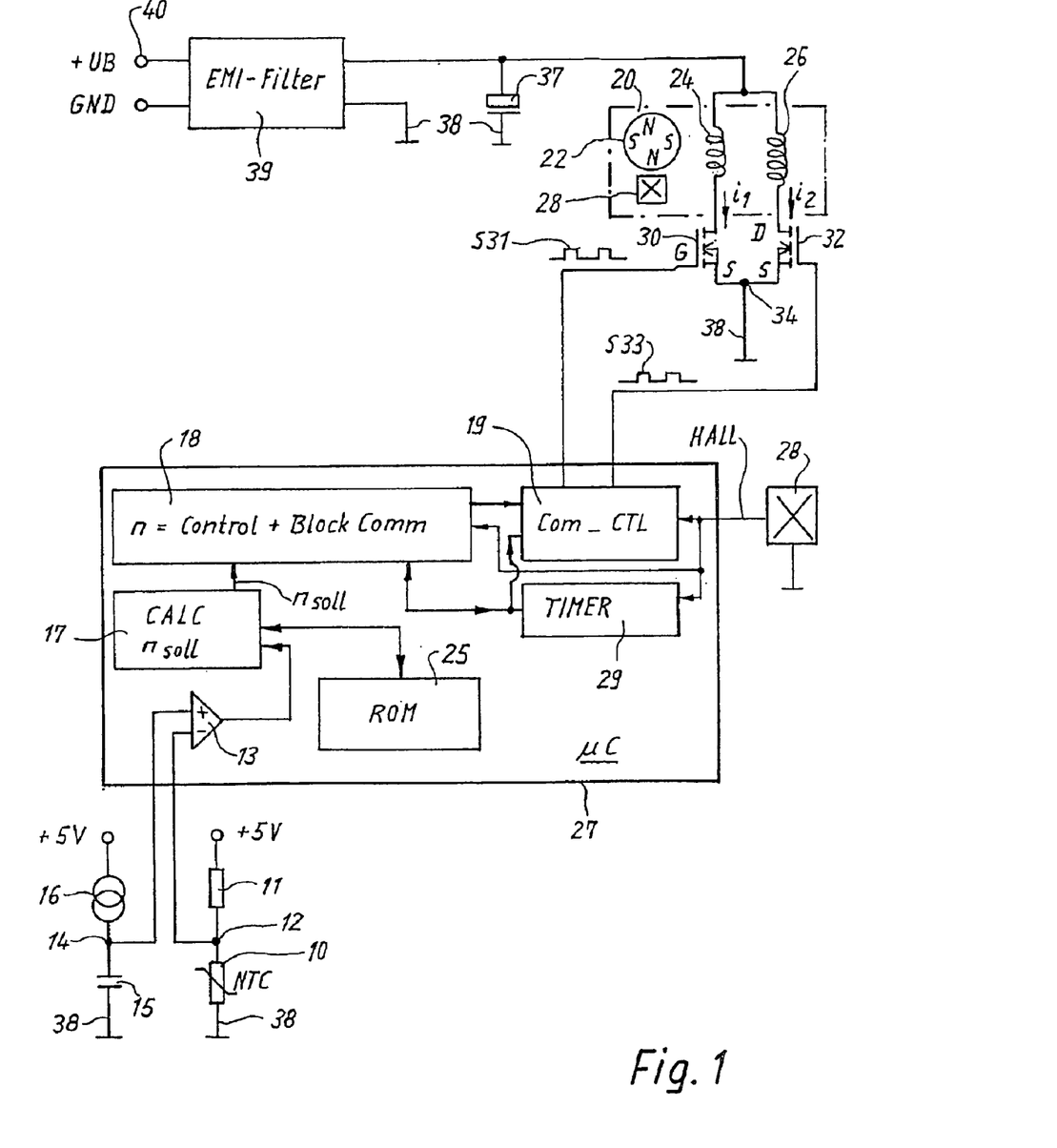
FIG. 1 is an overview diagram of a motor arrangement having electronic commutation.

FIG. 1 is an overview diagram of an electronically commutated motor (ECM) 20, known in terms of its fundamental configuration from EP 0 657 989 B1 and corresponding U.S. Pat. No. 5,845,045, JESKE et al. (Assignee docket no. EP-3008). It can serve, for example, to drive a fan whose rotation speed is controlled by a temperature-dependent Negative Temperature Coefficient (NTC) resistor 10 which is connected, in series with a resistor 11, to a constant voltage of 5 V. Connecting point 12 of resistors 10, 11 is connected to the negative input of a comparator 13 whose positive input is connected to a node 14 that is connected via a capacitor 15 to ground 38 and via a constant-current member 16 to +5 V. When the temperature of NTC resistor 10 is low, a fan of this kind runs slowly and requires little current to do so; at a high temperature it runs fast and then requires a great deal of current.

Capacitor 15 is charged linearly through constant-current member 16, and when the potential at node 14 exceeds the potential at node 12, comparator 13 delivers a signal to a target value calculation member CALC nsoll 17 which calculates a target value nsoll for the rotation speed, e.g. 1500 rpm at low temperatures, 3000 rpm at high temperatures, and intermediate values at temperatures located therebetween.

In this fashion, the quantity of air delivered by a fan is adapted to the temperature of the device to be cooled. The desired rotation speed nsoll in motor 20 can of course be controlled in any other way desired, e.g. by way of an electrical signal nsoll delivered directly from outside.

Target value nsoll calculated in calculation member 17 is conveyed to a controller 18, which here is a rotation speed controller but could also be a torque controller. Controller 18 generates setpoint values for a so-called block commutation system, which is explained below with reference to FIGS. 2 and 3.

The signals from controller 18 are conveyed to a commutation control system COMM_CTL 19, and the latter controls electronically commutated motor 20, which is depicted only schematically. It has a permanent-magnet rotor 22 (depicted with four poles), two winding phases 24, 26, and a Hall generator 28, controlled by the magnetic field of rotor 22, as a rotor position sensor. The latter is depicted twice—at the top right and center right—in FIG. 1.

Figure 9:
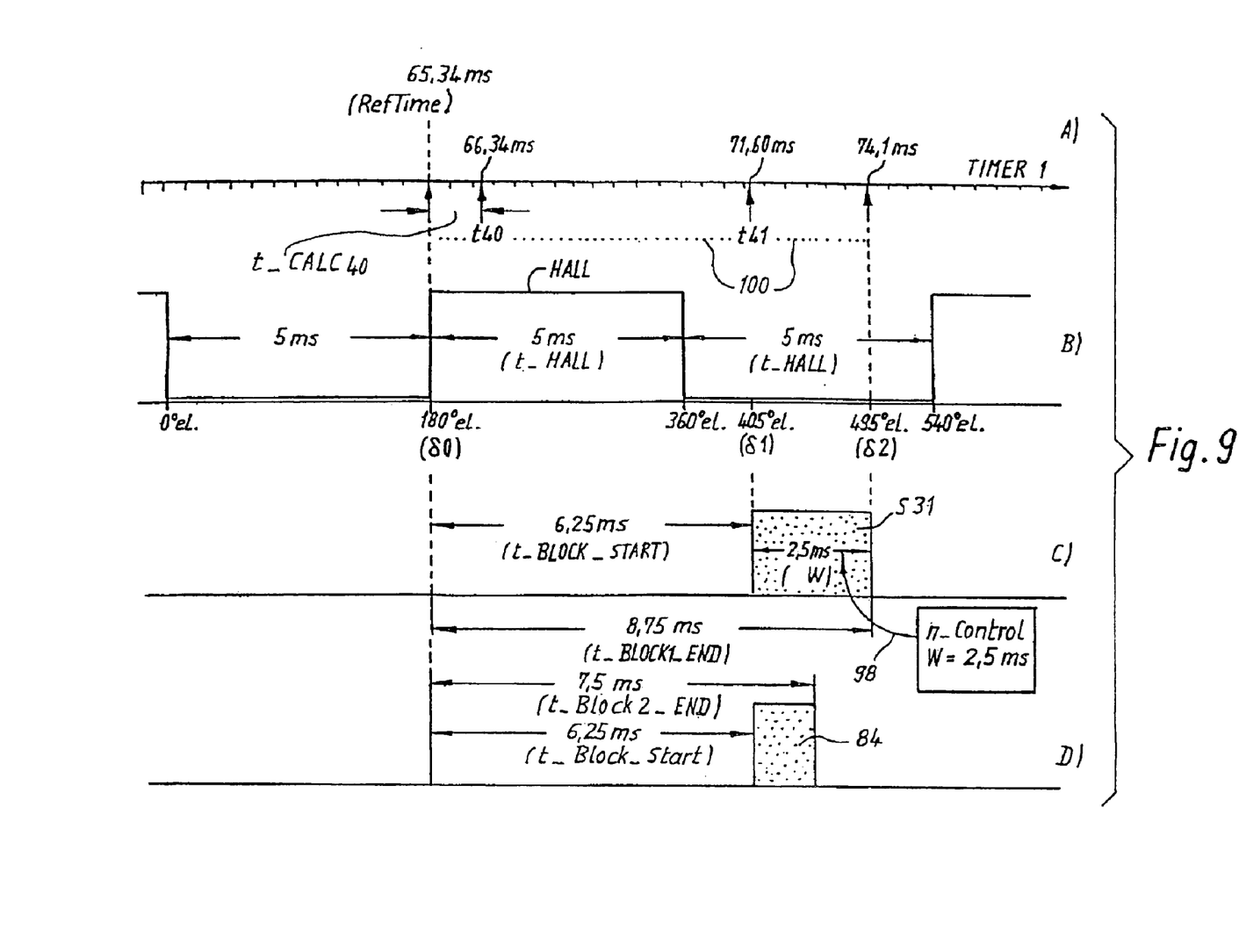
FIG. 9 is a diagram to explain commutation and the generation of elevated-frequency pulses 84 that influence current limiting.

Output signal HALL of Hall generator 28, which is depicted in FIG. 9A, is conveyed as shown in FIG. 1 to commutation control system 19, and further to rotation speed controller 18 which calculates therefrom the actual rotation speed, and to a timer 29 which ascertains, inter alia, the points in time at which signal HALL changes, as is described below in FIGS. 9 and 10.

As depicted, the various modules 13, 17, 18, 19, 21, 29, as well as a ROM 25 (having the program and program sections, depicted in FIG. 10, for regulating rotation speed), are constituents of a microcontroller ($\mu$C) 27 in which the various computation operations for control purposes, etc. are performed, as described in detail e.g. in EP 0 657 989 B1, JESKE.

Motor 20 can be, for example, a motor according to EP 0 908 630 A1, FEHRENBACHER et al., or according to DE 295 01 695.7 U1, or according to DE 8 702 271.0 U1, and instead of two phases 24, 26 it can also have only one phase or more than two phases. Its commutation can be controlled, rather than with a Hall generator 28, also e.g. by way of the voltages induced in the phases of the stator winding, as depicted by way of example in EP 1 107 441 A2, SCHMIDER. Operation by means of a full bridge circuit is also possible. The motor depicted therefore serves only to explain the invention in an easily understandable fashion by way of a simple example.

In this example, phase 24 is connected in series with an n-channel MOSFET transistor 30, and phase 26 is in series with a MOSFET transistor 32. These transistors can also be bipolar transistors, as described in the exemplary embodiments below. The source terminals of transistor 30, 32 are connected via a node 34 to ground 38. The drain of MOSFET 30 is connected via phase 24 and an EMI filter 39 to a positive terminal 40. The drain of MOSFET 32 is likewise connected via phase 26 and filter 39 to terminal 40 and to the positive voltage +UB there. A capacitor 37 serves as a filter member.

Figure 2:
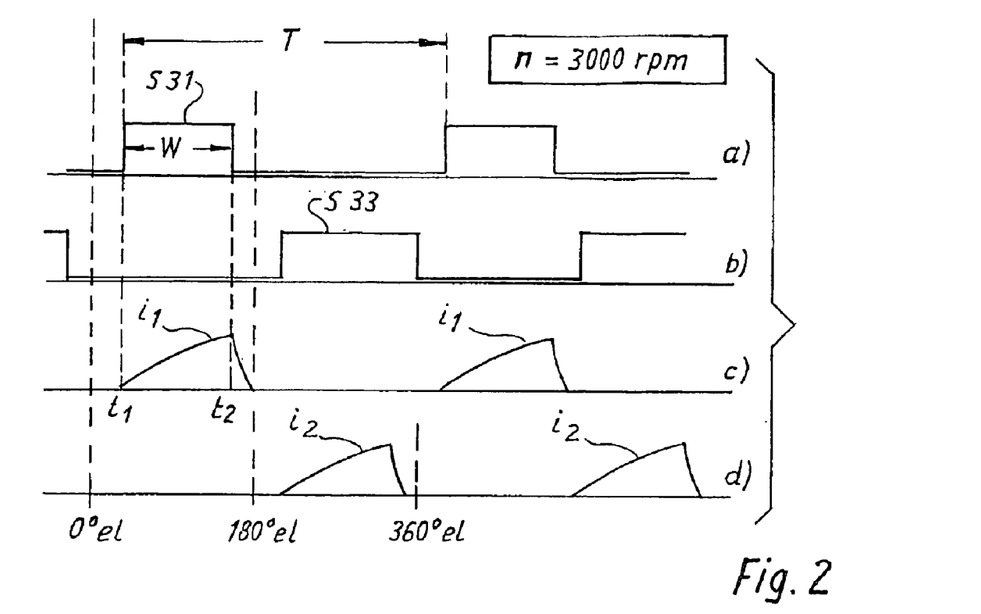
FIG. 2 is a schematic depiction to explain the manner of operation of the arrangement shown in FIG. 1 at high rotation speeds.

FIG. 2 schematically shows the signal shapes at a motor rotation speed of 3000 rpm.

Line a) shows the block-shaped control signals S31 that are conveyed from commutation control system 19 to the gate of MOSFET 30, and FIG. 2b shows the block-shaped signals S33 that are conveyed to the gate of MOSFET 32. Since motor 20 requires a high power level at this rotation speed, the pulse duty factor of signals S31 and S33 is high. This pulse duty factor is defined as the ratio between block length W and the pulse period T required by rotor 22 to rotate through 360° el., and corresponds (with a four-pole rotor 22) to half the time required by that rotor for one complete revolution. In other words:

$$\text{Pulse duty factor of block signals} = W/T \quad (1)$$

For example, at 3000 rpm a four-pole rotor 22 requires 20 ms for one complete revolution, i.e. 10 ms for a rotation through 360° el., so that at this rotation speed the value of W lies between 0 and 5 ms. Block-shaped signals S31 control current $i_1$ in phase 24, and signals S33 control current $i_2$ in phase 26. For example, the beginning t1 of block-shaped signal S31 switches on current $i_1$, and the end t2 of signal S31 switches off current $i_1$, which then decays subsequent to time t2 as a result of the inductance of phase 24. Corresponding free-wheeling diodes are integrated into transistors 30, 32 for this purpose. As FIGS. 2c and 2d show, currents $i_1$ and $i_2$ have a shape with a relatively low amplitude, since at 3000 rpm the voltage induced by rotor 22 in phases 24, 26, referred to as counter-EMF, is high.

Figure 3:
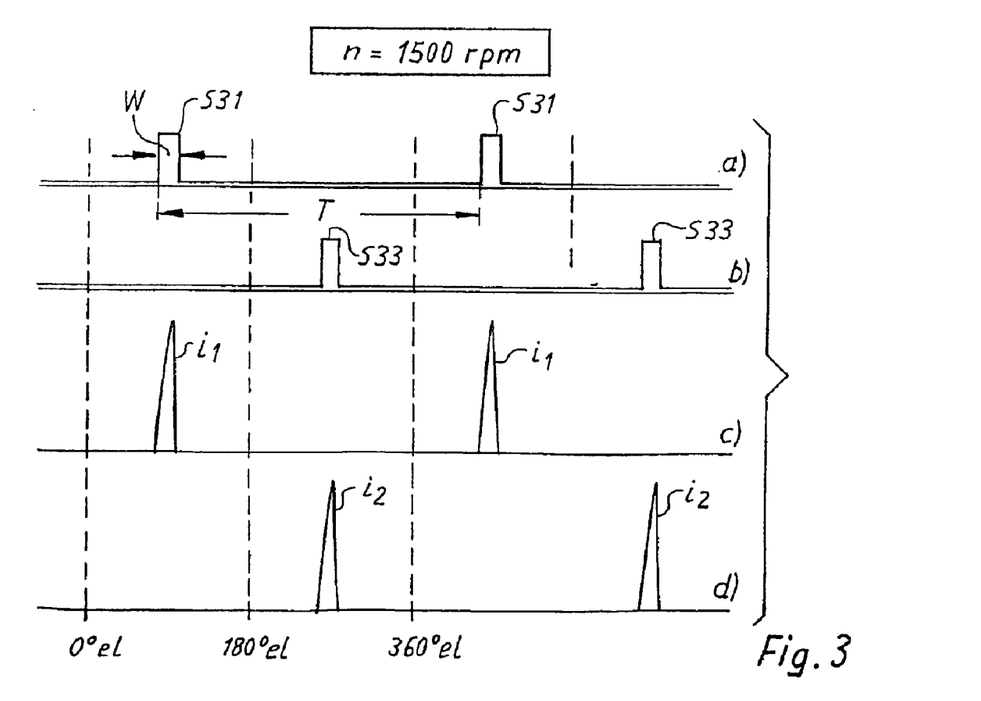
FIG. 3 is a schematic depiction to explain the manner of operation of the arrangement shown in FIG. 1 at low rotation speeds.

The situation is entirely different at a low rotation speed of 1500 rpm, as depicted in FIG. 3.

The block-shaped signals are again labeled S31 and S33 and have a very low pulse duty factor W/T, i.e. are practically in the form of needle pulses, since at these rotation speeds the power requirement of motor 20 is low.

Since the counter-EMF at these rotation speeds is low, these short block-shaped signals result in currents $i_1$, $i_2$ as depicted in FIGS. 3c and 3d. These are very short currents with very high amplitude, and these needle-shaped currents excite oscillations in motor 20, e.g. as a result of magnetostrictive effects. This type of short, high-amplitude current pulse is therefore unfavorable for a commercial product.

The present invention deals, among other things, with the problem of these needle-shaped currents, which are depicted in FIGS. 3c and 3d and which occur principally during operation at low rotation speeds, where these pulses have a particularly disruptive effect because of their low frequency.

Figure 4:
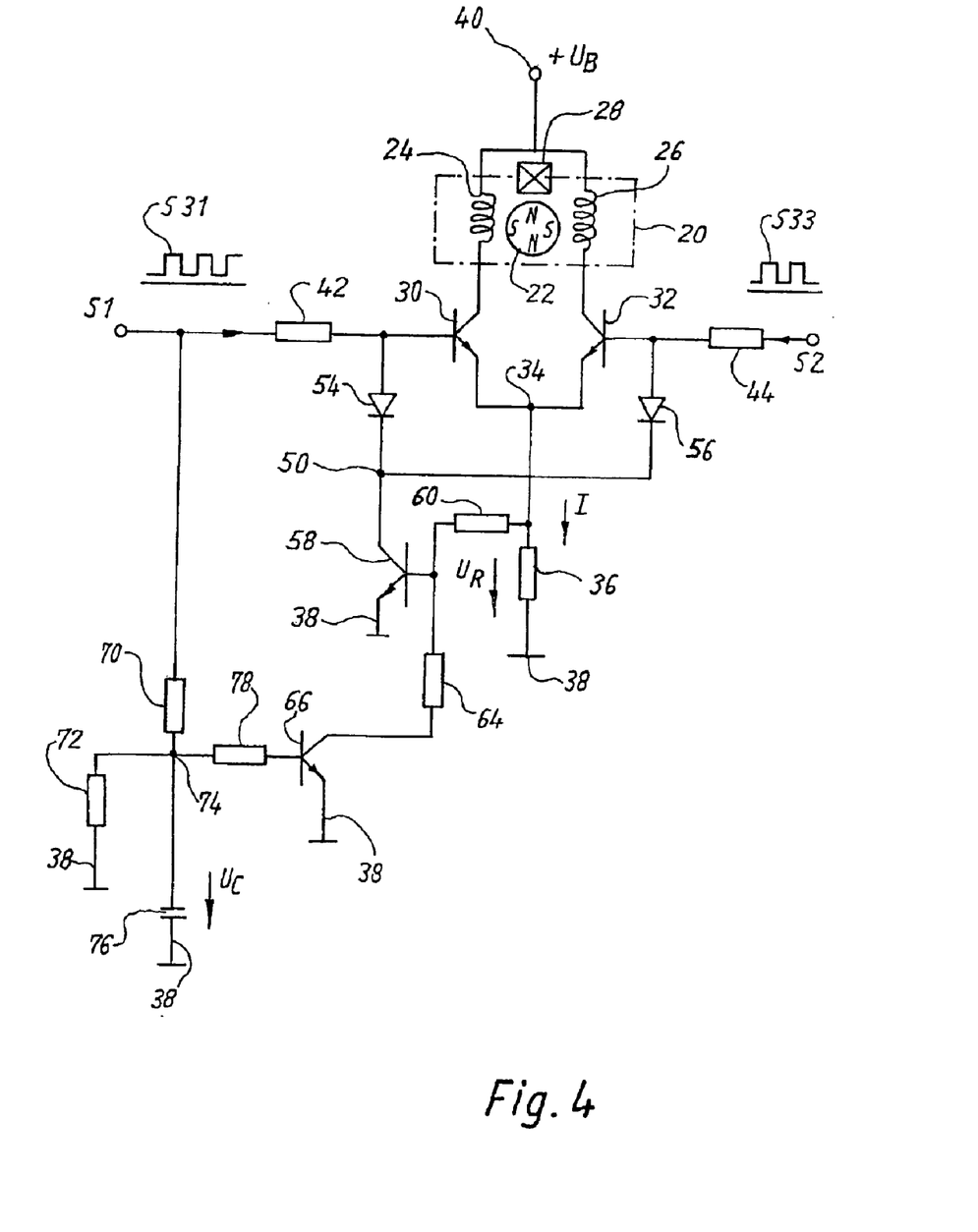
FIG. 4 shows a first exemplary embodiment of an ECM according to the invention.

FIG. 4 shows a first exemplary embodiment of an arrangement for carrying out a method according to the invention. In this example, phase 24 is connected in series with an npn transistor 30, and phase 26 is in series with an npn transistor 32. The emitters of transistors 30, 32 are connected to node 34, and the latter is connected to ground 38 via a shared emitter resistor 36 serving as measurement member. Motor current I therefore flows through resistor 36 and generates a voltage drop $U_R$ at resistor 36. The collector of transistor 30 is connected via phase 24 to positive terminal 40. The collector of transistor 32 is likewise connected via phase 26 to terminal 40 and to positive voltage +$U_B$ there.

Figure 5:
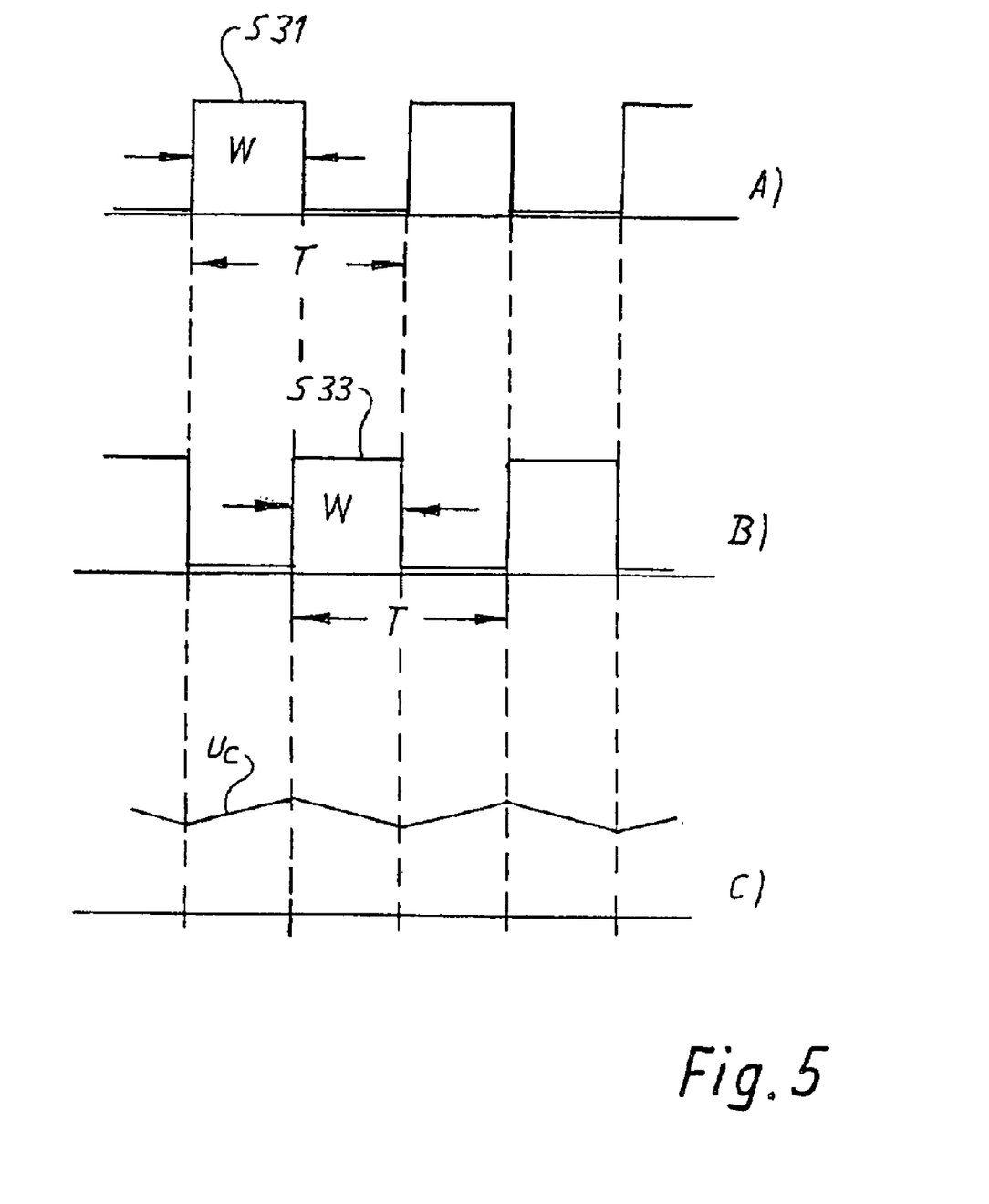
FIG. 5 is a highly schematized depiction of the profile of signals S31, S33, and uC in the motor of FIG. 4.

The base of transistor 30 receives, through a base resistor 42, control pulses S31 from an input S1; the base of transistor 32 similarly receives, through a resistor 44, control pulses S33 from an input S2. Control pulses S31, S33 are phase-shifted as shown in FIGS. 2, 3, and 5, and control the commutation of motor 20 in known fashion, the intention being that the two transistors 30, 32 are never conductive simultaneously. As shown in FIG. 1, pulses S31, S33 are preferably supplied by μC 27. Their block length is, as described, variable, and is determined by block controller 18.

The cathodes of two diodes 54, 56 are connected to a node 50. The anode of diode 54 is connected to the base of transistor 30, and that of diode 56 to the base of transistor 32. Also connected to node 50 is the collector of an npn transistor 58 whose emitter is connected to ground 38. When transistor 58 is partially conductive, and a positive pulse S31 arrives at the base of transistor 30, a portion of that pulse S31 then flows through diode 54 and transistor 58 to ground, depending on the conductivity of transistor 58. In this fashion, the amplitude of signals S31 and S33 can thus be controlled by modifying the conductivity of transistor 58 accordingly. When the latter is completely conductive it blocks both transistors 30 and 32, and motor current I becomes zero. When transistor 58 is completely nonconductive, it has no influence at all on motor current I.

Whereas with the approach depicted, using bipolar transistors 30, 32, the action of transistor 58 is based on the fact that transistors 30, 32 are operated in the so-called linear regions (i.e. as variable resistors), and a portion of the base current is taken away from them by transistor 58, when MOSFET transistors (such as those depicted in FIG. 1) are used, a portion of the gate voltage is taken away from them. This variant (not depicted) can readily be implemented by one skilled in the art.

The base of transistor 58 is connected via a resistor 60 to node 34, i.e. voltage $U_R$ at measuring resistor 36 is conveyed to that base. This means that an increase in motor current I, i.e. a rise in voltage $U_R$, causes transistor 58 to become more conductive and consequently causes a greater portion of the base current of transistors 30 and 32 to flow through it to ground 38, thus limiting high motor currents I to a setpoint value.

The base of transistor 58 is connected via a resistor 64 to the collector of an npn transistor 66 whose emitter is connected to ground 38. When this transistor 66 becomes conductive, it reduces the base current of transistor 58 so that the latter becomes conductive only at a higher motor current I. This is therefore a simple way to shift upward the setpoint value at which current limiting begins. When transistor 66 is completely conductive, it blocks transistor 58 so that no current limiting occurs. When transistor 66 is completely blocked, transistor 58 then receives the entire base current being conveyed to it through resistor 60, and motor current I is limited to a low value.

Transistor 66 can thus be operated either in the linear range, i.e. as a variable resistor, or in off/on mode (switched mode) if it is controlled e.g. by way of a PWM signal.

In the variant shown in FIG. 4, transistor 66 is controlled by a signal $u_C$ that is derived from control signal S31. The latter is applied to a voltage divider that is constituted by two resistors 70, 72 whose connecting point 74 is connected via a capacitor 76 to ground 38 and via a resistor 78 to the base of transistor 66. Resistors 70, 78 and capacitor 76 act as a filtering or integrating member for pulses S31, so that a smoothed voltage $u_C$, depicted in FIG. 5c, is obtained at capacitor 76. This voltage depends on pulse duty factor W/T of pulses S31, i.e. when W/T becomes smaller, $u_C$ also decreases; and vice versa.

Block length W of pulses S31, S33 is specified by controller 18. It depends on the motor's load. Because the motor requires higher power at higher rotation speeds, with increasing rotation speed the pulse duty factor W/T (see equation 1) increases and $u_C$ rises; transistor 66 consequently becomes more conductive, causes a greater reduction in the base current of transistor 58 and, as a result, shifts upward the setpoint value at which current limiting begins until the latter is completely switched off at high rotation speeds, allowing motor 20 to operate at its maximum power. When transistor 66 is completely conductive, current limiting is deactivated. The voltage $u_C$ at capacitor 76 can be modified by way of the ratio between resistors 70 and 72, and it is thereby possible to define the value of W/T at which the raising of the current limit begins.

In the arrangement according to FIG. 4, capacitor 76 is dimensioned so that voltage $u_C$ occurring there during operation fluctuates very little. (The fluctuations of $u_C$ shown in FIG. 5c are greatly exaggerated.) This dimensioning of capacitor 70 has the result that voltage $u_C$ at it can follow a change in the frequency and/or pulse duty factor of signal S31 only after a certain time delay.

Figure 6:
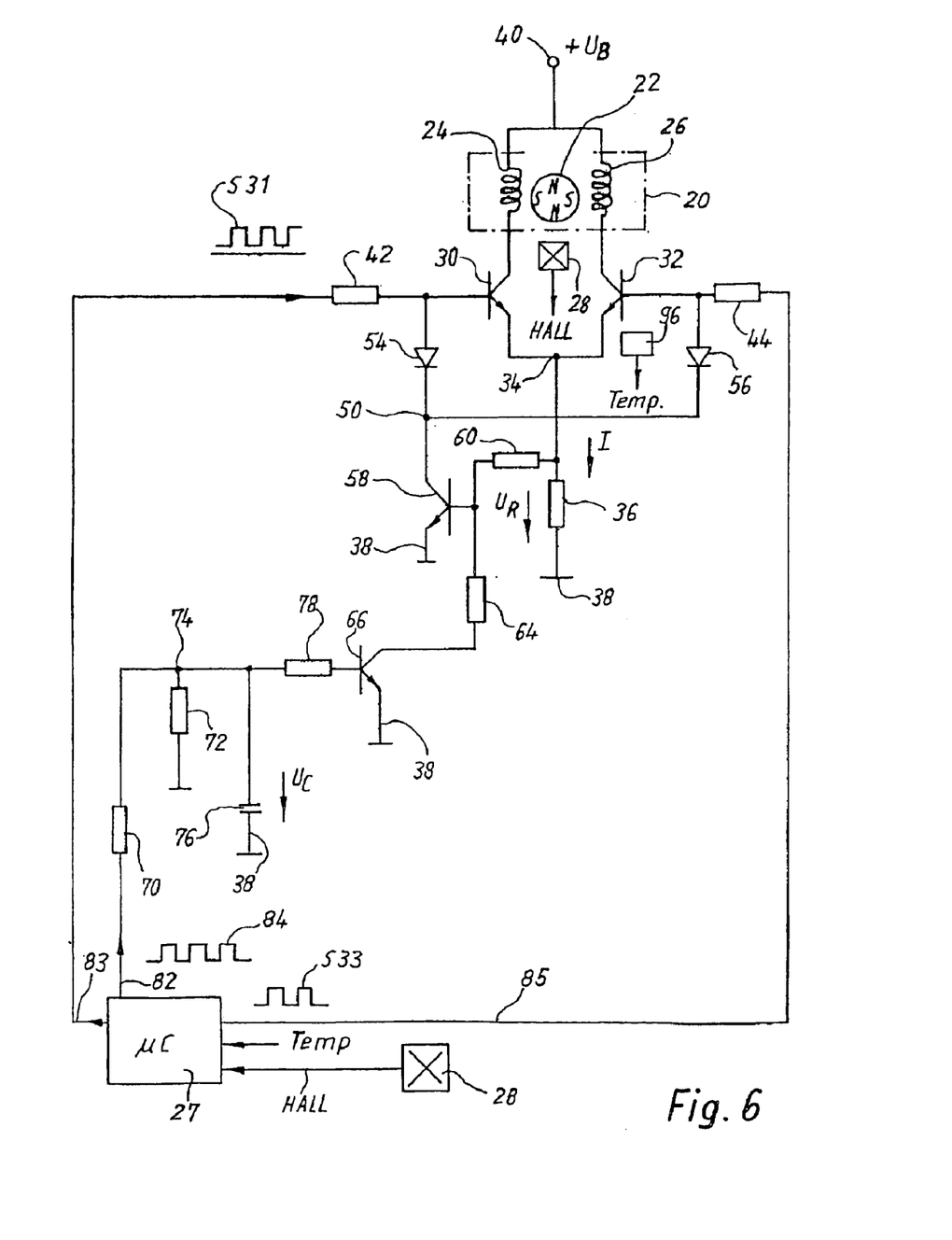
FIG. 6 shows a second exemplary embodiment of the invention in which the ECM is controlled by a $\mu C$ 27 that supplies signals S31 and S33 for commutation of the motor and that also influences the maximum permissible value of current I in the motor as a function of at least one parameter.
Figure 7:
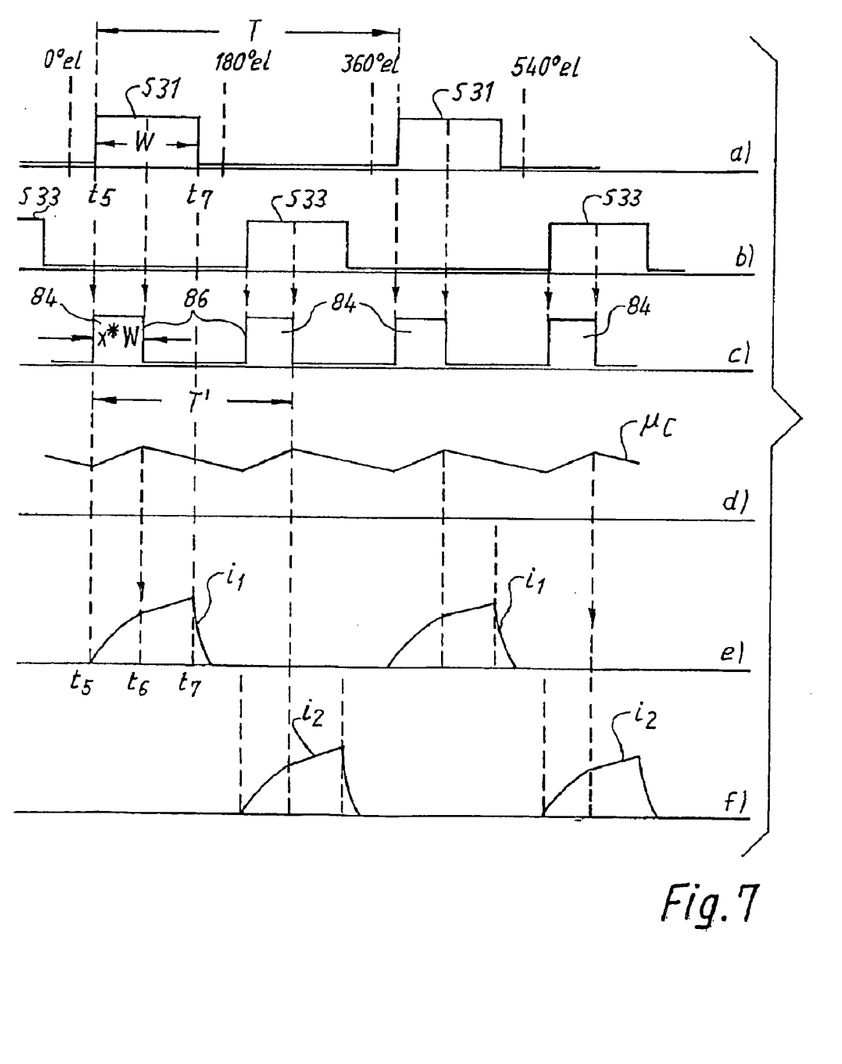
FIG. 7 is a first diagram to explain FIG. 6.

In the variant according to FIG. 6, just as in FIG. 1, signal HALL of Hall generator 28 is supplied to μC 27 as a rotation-speed-dependent signal. Just as in FIG. 1, μC 27 supplies signal S31 at an output 83 and signal S33 at an output 85. Signals S31, S33 serve to control transistors 30 and 32. In addition, a pulsed signal 84, which has twice the frequency of signal S31 and a shape similar to the latter and is depicted in FIG. 7c, is outputted at an output (port) 82 of μC 27. FIG. 7a shows signal S31, and FIG. 7b signal S33. Signals S31, S33 have the same pulse width W, the same frequency, and therefore the same pulse duty factor W/T. Signal 84 has a narrower pulse width, defined as:

$$\text{Pulse width of signal }84 = X*W \quad (2).$$

This pulse width is preferably approximately 50% of W, i.e. the pulse duty factor and therefore the information content of signal 84 is preferably approximately the same as for signals S31 and S33, but its frequency is twice as great, or optionally also four times as great.

The beginning of a pulse S31 preferably coincides with the beginning of a pulse 84, and likewise the beginning of a pulse S33 preferably coincides with the beginning of another pulse 84. This explained in more detail in FIGS. 9 and 10 using an example.

Since block length W for signals S31 and S33 is continuously recalculated in controller 18 (FIG. 1), the reduced block length X*W of pulses 84 can also very easily be calculated therein, e.g. by dividing by two. Signal 84 can therefore be generated very easily by μC 27.

As FIG. 6 shows, signal 84 is reduced in amplitude by voltage divider 70, 72. This voltage divider 70, 72 thus allows the onset of the current through transistor 66 to be defined.

According to FIG. 7d, what is obtained at capacitor 76 of FIG. 6 is a fluctuating DC voltage $u_C$ whose amplitude fluctuates at a frequency which is twice that in FIG. 5. Currents $i_1$ and $i_2$ (FIGS. 7e and 7f) are therefore influenced by the current limiter in exactly the same way, i.e. during a pulse 84, voltage $u_C$ rises and thereby elevates the current limit, and voltage $u_C$ decreases in interval 86 between two successive pulses 84, where the current limit therefore falls.

As a result, it is possible to shape the individual current pulses $i_1$, $i_2$ individually; i.e. in FIG. 7c, current $i_1$ rises sharply between times t5 and t6, and then less sharply between t6 and t7, since the current limit decreases there. The magnitude of the fluctuation (ripple) of signal $u_C$ in FIG. 7d can be set by selecting capacitor 76 of FIG. 6: if a smaller capacitor 76 is used, the ripple is large, and a correspondingly large fluctuation is obtained in the current limit in the course of a current pulse.

Figure 8:
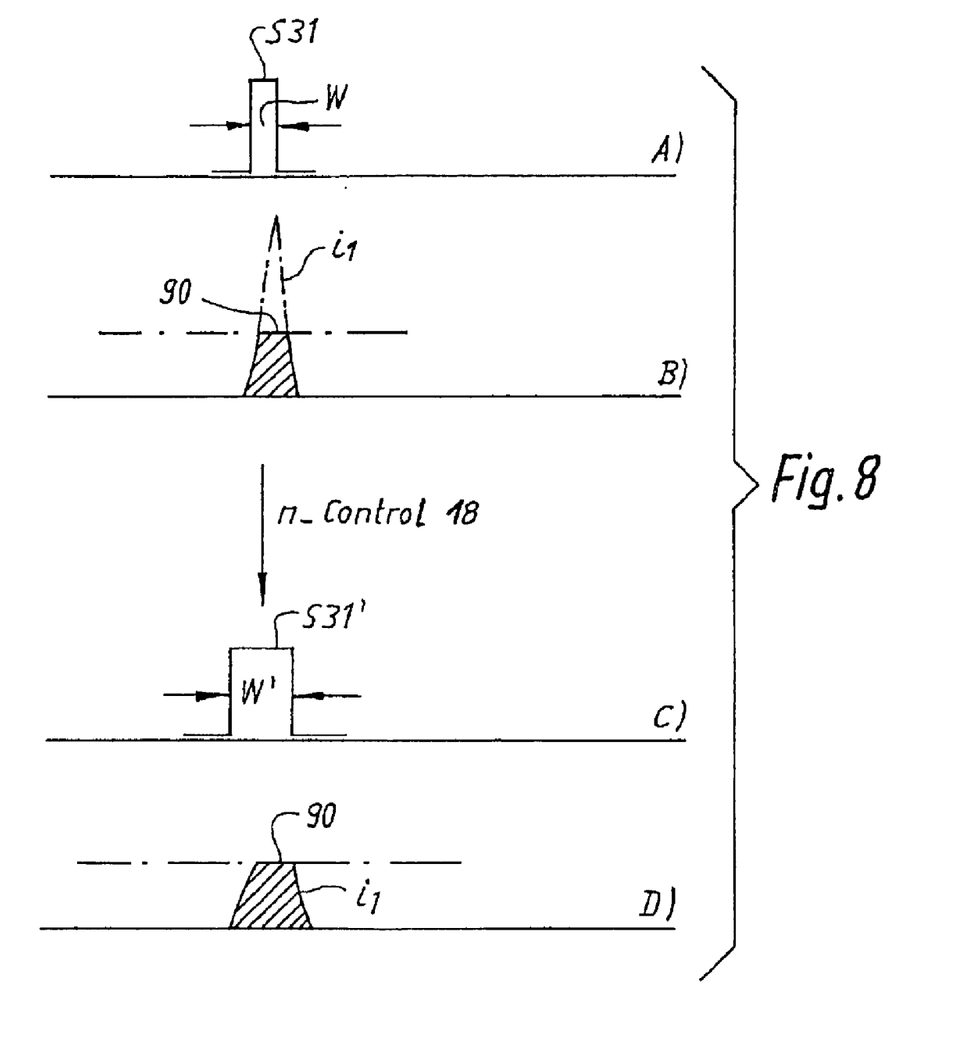
FIG. 8 is a second diagram to explain FIG. 6.

FIG. 8 shows what happens with a narrow pulse S31 (FIG. 8A), which is also depicted in FIG. 3. This control pulse S31 would by itself result in a needle pulse $i_1$ (FIG. 8B), but in such a case $u_C$ (FIGS. 6 and 7) becomes practically zero, i.e. transistor 66 becomes blocked and current limiting by means of transistor 58 becomes completely effective, so that needle-shaped current pulse $i_1$ is capped at point 90.

As a result, motor 20 receives less energy and its rotation speed drops below the preset target value. N-controller 18 (FIG. 1) therefore causes a widening of the pulse width from W (FIG. 8A) to W' (FIG. 8C), thereby correspondingly widening the capped current pulse $i_1$ (see FIG. 8D). This means that what is obtained, instead of a short needle pulse as shown in FIG. 8B, is a pulse as shown in FIG. 8D, with a low amplitude but increased width. It is as if this sharp needle pulse had been "mashed down" by electronic means, by transforming it from the shape shown in FIG. 8B to the shape shown in FIG. 8D. This greatly reduces the noise of the motor, and its efficiency becomes better because current losses decrease, especially at low rotation speeds. As FIGS. 7 and 9 show, control pulses S31, S33 are preferably applied in such a way that they switch on the current at the maximum of the induced voltage, since this yields good efficiency. At higher rotation speeds, the control pulses can be advanced slightly in order to improve motor efficiency. This will be explained below with reference to FIG. 9.

The temperature Temp of transistors 30, 32 can be sensed using a sensor 96, and then also conveyed to $\mu$C 27. If that temperature becomes too high, transistor 66 becomes more conductive or even completely conductive, so that current limiting is less effective or not effective at all: transistors 30, 32 are no longer operated as resistors, but instead are fully conductive in the switched-on state, and therefore become colder again. This can be achieved, for example, by increasing the value of factor X (equation 2). This factor can, for example, be derived as a function of temperature Temp from a table in ROM 25. The maximum temperature of transistors 30, 32 can thereby be influenced in the desired fashion.

In a motor that drives a fan controlled by ambient temperature, a low ambient temperature means a low motor rotation speed. At low temperatures, transistors 30, 32 can experience greater thermal loads by being operated as resistors, meaning an increased power loss in these transistors. In this case, at lower temperatures, the transistors can therefore be operated in "linear mode," i.e. as variable resistors, whereas at high rotation speeds (and correspondingly high ambient temperatures) they are preferably operated in so-called "switched mode," in which the transistors operate with low losses.

$\mu$C 27 can also have conveyed to it a signal which indicates the value of operating voltage $U_B$, which in battery-operated motors can fluctuate within wide limits. At a high operating voltage, the value for current limiting can be correspondingly increased by making transistor 66 more conductive, or completely conductive, by increasing factor X (equation 2).

If resonance problems occur in a motor at certain rotation speeds, it is desirable to pass through those rotation speed ranges quickly. In such a case current limiting is deactivated at the relevant rotation speed, so that that rotation speed range is passed through at maximum power.

By adapting the current limit during operation, as depicted in FIG. 7, it is possible to modify the commutation, i.e. the rate of change du/dt and di/dt at transistors 30 and 32, and thus the behavior of motor 20 during operation, as desired and, so to speak, in customized fashion.

FIG. 9 shows the principle governing commutation in the region of the induced voltage maximum—also referred to as "center commutation"—as well as the generation of signal 84. The arrangement is based on a time measurement by means of timer 29 in $\mu$C 27. This timer continuously measures time, as depicted symbolically in FIG. 9A.

During the rotation of rotor 22, Hall generator 28 generates signal HALL, which e.g. assumes a LOW value at 0° el. and a HIGH value at 180° el., and once again becomes LOW at 360° el. This signal is depicted in FIG. 9B.

A reference time RefTime is measured at a change in signal HALL from LOW to HIGH; in the example shown in FIG. 9, for example, the time is 65.34 ms. This time serves as the reference point for the subsequent calculations. The reference times at a change in signal HALL from LOW to HIGH serve to control current $i_1$, and the reference times at the change in signal HALL from HIGH to LOW serve to control current $i_2$. FIG. 9 shows an example of how current $i_1$ is controlled; current $i_2$ is controlled in entirely analogous fashion.

N-controller 18 (FIG. 1) calculates a certain block length W, and in this example it is assumed to be W=2.5 ms. The length of a block 84 is then, for example, half that value, i.e. W/2=1.25 ms.

FIG. 9 shows a quantitative example for a rotation speed n=3000 rpm and a four-pole rotor 22. In such a case:

$$t\_HALL=60/(3000*4)=0.005\ s=5\ ms \quad (3)$$

This is the time needed by rotor 22 at 3000 rpm to rotate 180° el., i.e. for one-quarter of a revolution.

Based on time t_HALL and time W, a number of times can be calculated as follows:

$$t\_BLOCK\_START=t\_HALL+(t\_HALL-W)/2 \quad (4)$$

$$t\_BLOCK1\_END=t\_BLOCK\_START+W \quad (5)$$

$$t\_BLOCK2\_END=t\_BLOCK\_START+X*W \quad (6)$$

In FIG. 9, for example, as indicated in the drawing:

$t\_BLOCK\_START=6.25$ ms $t\_BLOCK1\_END=8.75$ ms and $t\_BLOCK2\_END=7.5$ ms, assuming X =0.5.

From the calculated values, it is known predictively in this example that, based on reference time RefTime corresponding to the angle $\partial 0$, the rotational position $\partial 1$ (405° el.) at which current $i_1$ must be switched on will be reached after a time of 6.25 ms. It is also known predictively that the rotational position $\partial 2$ (495° el.) at which current $i_1$ must be switched off will be reached after a time of 8.75 ms.

FIG. 9 also shows, as an example, that a reference time of 65.34 ms was measured in timer 29 at reference time RefTime $\partial 0$ (180° el.).

The procedure for monitoring switching on at $\partial 1$ and switching off at $\partial 2$ is to continuously calculate the difference in time t_CALC between the instantaneously measured time t_TIMER and 65.34 ms. The equation for this is $$t\_CALC=t\_TIMER-RefTime \quad (7).$$

If, for example, timer 29 measures a time of 66.34 ms at time t40, the resulting difference is then $$t\_CALC_{40}=66.34-65.34=1 \text{ ms.}$$

Since current $i_1$ needs to be switched on only after a time of 6.25 ms, 1 ms is too little, and current $i_1$ is not yet switched on.

If, at time t41, the present time in timer 29 is 71.60 ms, the resulting difference is then $$t\_CALC_{41}=71.60-65.34=6.26 \text{ ms.}$$

In this case current $i_1$ is switched on at time t41, since $t\_CALC_{41}$ is greater than 6.25 ms. A pulse 84 is also started in this case.

Starting at rotational position ∂0, therefore, the system constantly monitors whether t_CALC has become greater than or equal to t_BLOCK_START; when that is the case, transistor 30 is switched on (FIG. 6) and a pulse 84 is generated.

The same principle is used for switching off, except that t_CALC is compared to the value t_BLOCK1_END. In FIG. 9 that value is 8.75 ms. It corresponds to the switching-off angle 82, and when that value is reached, transistor 30 is switched off. Output (port) 82 is switched back to zero when time t_BLOCK2_END is reached, i.e. in this case a time of 7.5 ms.

Commutation, and generation of signal 84, are based on the fact that at short intervals of e.g. 0.1 ms, time t_CALC is recalculated and is compared to the values t_BLOCK_START, etc. previously calculated in accordance with equations (4) through (6). This occurs in FIG. 9A between times 65.34 ms and 74.1 ms, and is indicated by dots 100. The basis used for each current block is a reference angle associated with it, at which a reference time RefTime for that current block is measured and is then used for the comparisons (using equation 7). As rotor 22 rotates, new reference times are therefore constantly calculated, and new comparisons are made, so that currents $i_1$ and $i_2$ through windings 24 and 26 are correctly controlled; in other words, the reference angles "migrate" as rotor 22 rotates.

If the current is to be switched on earlier by an amount equal to a time ZV=0.4 ms, which is also referred to as "ignition advance" (even though nothing is being ignited), the time used in FIG. 9 for switching on is therefore, instead of the 6.25 ms time, a time of $$6.25-0.4=5.85 \text{ ms,}$$

for switching off a time of $$8.75-0.4=8.35 \text{ ms,}$$

and for the end of signal 84 a time of $$7.50-0.4=7.10 \text{ ms.}$$

At this rotation speed, angle ∂1 is then shifted 14.4° el. to the left to 390.6° el., and angle ∂2 is also shifted 14.4° el. to the left, to 480.6° el.; in other words, current $i_1$ is switched on and off at an earlier time, and the angle defining how much earlier it is switched on and off increases with increasing rotation speed, here being 14.4° el. at 3000 rpm, 28.8° el. at 6000 rpm, etc. ZV will usually be a function of rotation speed. This earlier switching of the currents in windings 24 and 26 can improve the efficiency of motor 20 at higher rotation speeds, and is easy to implement here.

Figure 10:
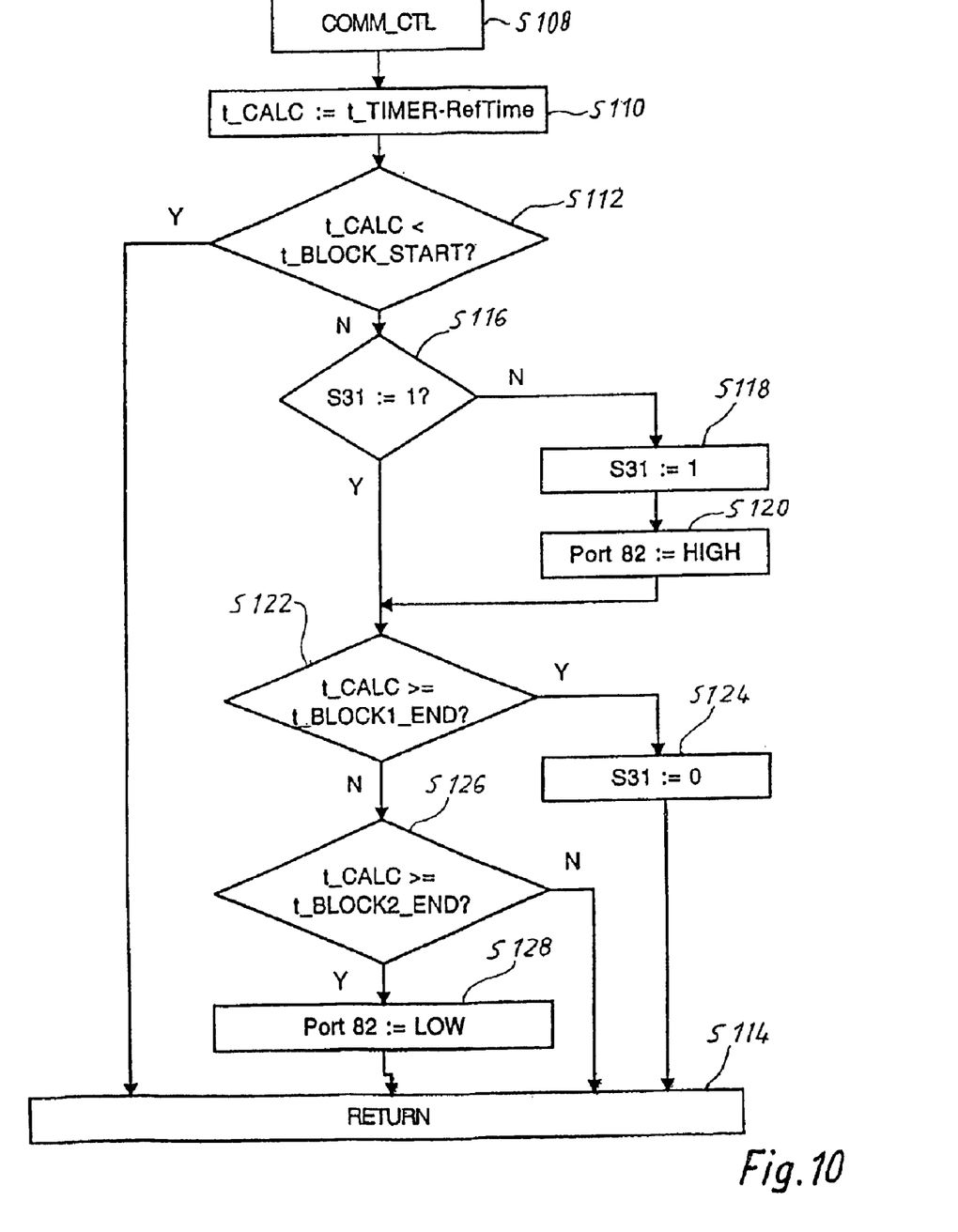
FIG. 10 is a flow chart to explain FIG. 9.

FIG. 10 shows the flow chart for commutation control system COMM_CTL S108.

At S110, the present time difference t_CALC, referred to reference time RefTime, is calculated in accordance with equation (7). S112 checks whether time t_BLOCK_START has been reached yet. If Yes, the program goes directly to Return S114. If No, the program goes to S116, which checks whether signal S31 already has a value 1, i.e. whether transistor 30 has already been switched on. If No, the program does to step S118, where S31=1 is set and saved, i.e. transistor 30 is switched on, and a current $i_1$ begins to flow in winding 24. Then, at S120, port 82 is switched to HIGH, i.e. the beginning of a pulse 84 is generated. The program then goes to step S122.

If the response in S116 is Yes, the program goes directly to S122.

S122 checks whether the value t_BLOCK1_END has already been reached. If Yes, then in S124 signal S31 is switched to LOW, so that transistor 30 is switched off; the program then goes to S114.

If it is found at S122 that time t_BLOCK1_END has not yet been reached, the program goes to S126. This checks whether the value t_BLOCK2_END has been reached. If No, the program goes directly to S114. If Yes, then in S128 port 82 is set to LOW, i.e. pulse 84 is terminated and in this case has a duration of X*W. The value of X can be specified in suitable fashion. A value of approx. 50% has proven advantageous in experiments.

The other output-stage transistor 32 is controlled in entirely analogous fashion, and this process is therefore not presented.

Numerous variants and modifications are obviously possible in the context of the present invention. For example, instead of the one transistor 58 which influences several output stages 30, 32 via diodes 54, 56, two separate transistors could be used, one of them influencing the base current of transistor 30 and the other the base current of transistor 32, and these in turn could be influenced by transistor 66 via corresponding diodes; or two separate transistors 66 could also be used in this case. In FIG. 4, transistor 66 could obviously be controlled just as easily by signal S33 as by signal S31, since these signals differ only in terms of a phase shift. These and similar variants are within the discretion of one skilled in the art.

What is claimed is:

1. A method of controlling the commutation of an electronically commutated motor which comprises a stator having at least one winding phase, and a rotor arranged for interaction with said stator, said motor having associated therewith a controller adapted for controlling a motor variable by controlling distance in time between switching-on and switching-off the current in said winding phase, and having further associated therewith a current limiter implemented to limit the current in said phase to a selectable setpoint value, said method comprising the steps of:
   determining a factor, characterizing the relationship between said distance in time, and the time span needed by the rotor for rotation through a specified rotation angle at the rotor's current speed, and
   modifying the setpoint value, as a function of said factor.

2. The method according to claim 1,
   further comprising elevating the setpoint value for the current limiter as the value of said factor increases.

3. The method according to claim 1,
   further comprising setting the setpoint value, during the duration of a current pulse flowing in the at least one phase, to an increasing value in a first time period, and to a decreasing value in a second time period subsequent thereto.

4. The method according to claim 1,
further comprising controlling the setpoint value by means of a current limiting control signal which, with reference to the instantaneous frequency of a signal serving to control the commutation, has a frequency which is greater by an integral factor.

5. The method according to claim 4,
wherein the current limiting control signal has a frequency that is equal to at least twice the frequency of a signal serving to control the commutation.

6. The method according to claim 4,
wherein the current limiting control signal has a pulse duty factor (X * W/T') which is similar to the pulse duty factor (W/T) of a signal serving to control the commutation.

7. A method of controlling the commutation in an electronically commutated motor which comprises a stator having at least one winding phase,
a permanent-magnet rotor arranged for interaction with said stator, a speed controller for controlling motor speed to a setpoint rotation speed,
computer means for generating a first switching signal having a frequency determined by the actual rotation speed of the motor, and
a pulse duty factor determined by a difference between the setpoint rotation speed and the actual rotation speed, comprising the steps of:
using the first signal to control switching on and switching off the current in said winding phase,
generating a second signal which has twice the frequency of the first signal and a pulse duty factor similar thereto; and
using the second signal to control the shape of the current in the winding phase.

8. An electronically commutated motor (20) comprising
a stator having at least one winding phase
a permanent-magnet rotor,
a speed controller for generating a first control signal for controlling the rotation speed of said motor,
a first semiconductor element controllable by the first control signal, and
a measuring member (36), for sensing the current (i1, i2) flowing through said winding phase, being provided in series with said winding phase,
a second semiconductor element (58) which is controllable by the voltage (uR) at said measuring member (36) and which, as a function of its state, influences the magnitude of the control signal (S31, S33) that is supplied to the first semiconductor element (30, 32) in order, upon a rise in the current (I) through the resistor (36), to reduce the conductivity of said first semiconductor element (30, 32) and thereby to limit said current (I) to a predetermined value,
and a third controllable semiconductor element for controlling said predetermined value, as a function of a motor parameter.

9. The motor according to claim 8,
wherein the conductivity of the third controllable semiconductor element is controllable as a function of the information content of a control signal which is applied to a control electrode of the first semiconductor element while the motor is in operation, in order to control commutation of said semiconductor element.

10. The motor according to claim 9,
wherein the signal applied to the control electrode of the first semiconductor element is applied through a filtering member to the third controllable semiconductor element (66) as an additional control signal.

11. The motor according to claim 8, whose rotation speed is controlled by a temperature in such a way that the rotation speed of the motor is lower at a low temperature than at a higher temperature.

12. The motor according to claim 8, further comprising a rotation speed controller which regulates the motor rotation speed to a specified value (nsoll).

13. The motor according to claim 12,
wherein the rotation speed controller is implemented to set the specified value (nsoll) as a function of a temperature.

14. An electronically commutated motor comprising
a stator which comprises at least two winding phases,
a permanent-magnet rotor,
a semiconductor element controllable by means of an associated first control signal (S31, S33), being provided in series with each winding phase, for controlling the phase current (il, i2) flowing through said winding phase and for controlling the rotational steed of the motor to a setpoint speed,
a shared measuring member (36) for sensing the current (I) flowing in the winding phases,
a semiconductor element (58) associated with the shared measuring member (36) and controllable by the voltage (uR) thereat and which, as a function of its state, influences, via a respective diode (54, 56), the magnitude of that control signal (S31, S33) supplied to the presently conducting semiconductor element (30, 32) for control of the phase current (il, i2) associated therewith, in order, upon a rise in the current (I) through the measuring member (36), to reduce the conductivity of said presently conducting semiconductor element (30, 32) and thereby to limit that current (I) to a predetermined value, and
an additional controllable semiconductor element for controlling said predetermined value as a function of a motor parameter.

15. The motor according to claim 14,
wherein the conductivity of the additional semiconductor element (66) is influenced by the pulse duty factor (W/T) of the first control signal (S31, S33).

16. The motor according to claim 14,
wherein the conductivity of the additional semiconductor element (66) is controllable by means of an additional control signal (84), derived from a first control signal (S31, S33), which has a frequency that is at a specified ratio to the frequency of the first control signal (S31, S33) and is higher than the latter.

17. The motor according to claim 16,
wherein the information content of the additional control signal (84) is substantially determined by the information content of the first control signal (S31, S33).

18. An electronically commutated motor (20) comprising
a stator which comprises at least one winding phase,
a permanent-magnet rotor (22),
a semiconductor element (30, 32), controllable by means of a first control signal (S31, S33) that has a frequency (1/T) determined by the motor rotation speed and has a specified pulse duty factor, said semiconductor element being provided in series with the at least one winding phase, the first signal (S31) controlling the switching on and off of that semiconductor element (30, 32), and a signal source (27) for a second signal (84) whose frequency (1/T') is an integral multiple of the frequency (1/T) of the first signal (S31) and which serves to influence, in operation, the shape of the current (i1) flowing through the at least one winding phase (24).

19. The motor according to claim 18, wherein the pulse duty factor (X * W/T') of the second signal (84) is similar to the pulse duty factor (W/T) of the first signal (S31).

20. The motor according to claim 18, wherein the frequency of the second signal (84) is twice the frequency of the first signal (S31).

21. The motor according to claim 18, wherein an additional controllable semiconductor element (66) is provided which, as a function of the second signal (84), influences the conductivity of the controllable semiconductor element (30) connected in series with the at least one winding phase (24) when the latter element is switched on by the first signal (S31).

* * * * *